United States Patent
Su et al.

(10) Patent No.: US 7,383,060 B2
(45) Date of Patent: Jun. 3, 2008

(54) MOBILE PHONE WITH FM ANTENNA

(75) Inventors: Jia-Hung Su, Chung Ho (TW); Hong-Ren Chen, Chung Ho (TW); Huang-Tse Peng, Chung Ho (TW); Yu-Yuan Wu, Chung Ho (TW)

(73) Assignee: Darts Technologies Corp., Taipei County (TW)

( * ) Notice: Subject to any disclaimer, the term of this patent is extended or adjusted under 35 U.S.C. 154(b) by 374 days.

(21) Appl. No.: 11/220,775

(22) Filed: Sep. 6, 2005

(65) Prior Publication Data

US 2007/0054693 A1  Mar. 8, 2007

(51) Int. Cl.
*H04M 1/00* (2006.01)

(52) U.S. Cl. .................. 455/550.1; 455/556.1; 455/553.1; 455/557.7; 343/700 MS; 343/702

(58) Field of Classification Search ............. 455/550.1, 455/556.1, 553.1, 557.7, 129; 343/700 MS, 343/702
See application file for complete search history.

(56) References Cited

U.S. PATENT DOCUMENTS 5,444,452 A * 8/1995 Itoh et al. ............. 343/700 MS
5,801,660 A * 9/1998 Ohtsuka et al. ....... 343/700 MS
6,667,718 B2 * 12/2003 Back et al. ........... 343/700 MS
6,762,724 B2 * 7/2004 Peng ....................... 343/702
7,030,815 B2 * 4/2006 Dunn et al. ........... 343/700 MS
7,039,437 B2 * 5/2006 Kojola et al. ............. 455/550.1
2003/0214442 A1 * 11/2003 Back et al. ........... 343/700 MS

FOREIGN PATENT DOCUMENTS

WO  WO 2005024997 A1 * 3/2005

* cited by examiner

*Primary Examiner*—Matthew Anderson
*Assistant Examiner*—Minh D Dao

(57) ABSTRACT

A mobile phone with FM antenna includes a mobile phone body, an FM antenna, an FM microchip and a phone case. The FM antenna is fixed to an outer side of the mobile phone body. One end of the FM antenna has a feed point, and the other end of the FM antenna is an opening end. The FM antenna resonates at FM radio frequencies so as to receive FM radio signals. The FM microchip is disposed on the mobile phone body and coupled with the feed point of the FM antenna for processing the FM radio signals. The phone case encloses the mobile phone body, the FM antenna and the FM microchip. Thus the FM antenna is embedded in the mobile phone to enable the mobile phone to receive FM radio without extra external earphones.

3 Claims, 5 Drawing Sheets

MOBILE PHONE WITH FM ANTENNA

BACKGROUND OF THE INVENTION

1. Field of the Invention

The present invention relates generally to a mobile phone with FM antenna, and more particularly, to a mobile phone with FM antenna providing broadband FM reception.

2. The Related Art

Nowadays, most mobile phones are integrated to be multifunctional, such as taking images, listening to music, etc. among which FM (Frequency Modulation) broadcasting radio receiving function has come first to be the most popular function. Thus, most mobile phone manufacturers combine the mobile phones with FM function so that the mobile phones are capable of receiving FM broadcasting besides telephone communication to cater to the need of customers.

Conventional mobile phones themselves have no FM antenna to receive FM radio signals. So the conventional mobile phone must be equipped with a pair of external earphones that serve as an FM antenna and transmitting audio signals. When using the FM function of the conventional mobile phone, consumers should firstly insert the pair of earphones into earphone jacks of the conventional mobile phone, thereafter, the consumers can use the mobile phone to receive the FM radio and listen to the FM broadcasting.

However, as the earphone is used as an FM antenna as well as an earphone function to transmit audio signals in the meanwhile, the efficiency of the FM antenna is badly effected while the earphone transmits the audio signals, and otherwise, other electronic components, such as antistatic electricity components of the earphone, also bring negative impact on the performance of the FM antenna. For example, the FM antenna has lower gain, louder noise, and poor receiving efficiency.

Another obvious disadvantage of the conventional mobile phone with FM function is that FM function rarely works unless the earphone is inserted into the earphone jack as an FM antenna to receive FM radio signals. So it is necessary to carry the earphone all the time while using the FM function, otherwise the FM function does not work. Therefore, the FM function of the conventional mobile phone is inconvenient for the consumers to use.

SUMMARY OF THE INVENTION

It is therefore an object of the present invention to provide a mobile phone with FM antenna capable of providing excellent FM broadcasting reception with broadband performance without external earphones.

To achieve the above object, a mobile phone with FM antenna for FM radio reception comprises an FM antenna, an FM microchip, a mobile phone body and a phone case. The FM antenna is fixed to an outer side of the mobile phone body. One end of the FM antenna has a feed point, and the other end of the FM antenna is an opening end. The FM antenna resonates at FM radio frequencies so as to receive the FM radio signals. The FM microchip is disposed on the mobile phone body and coupled with the feed point of the FM antenna for processing the FM radio signals. The phone case encloses the mobile phone body, the FM antenna and the FM microchip.

As described above, the FM antenna is embedded in the mobile phone. It is convenient for consumers to use the mobile phone for listening to the FM broadcasting freely without extra external earphones. And the independent FM antenna will not be interfered thus obtaining excellent performance while receiving the FM radio.

The above-mentioned and other features and objects of this invention and the manner of attaining them will become more apparent and the invention itself will be better understood by reference to the following description of preferred embodiments of the invention taken in conjunction with the accompanying figures wherein:

DETAILED DESCRIPTION OF THE PREFERRED EMBODIMENTS

For facilitating understanding, like components are designated by like reference numbers throughout the various embodiments of the invention in the attached drawings.

Figure 1:
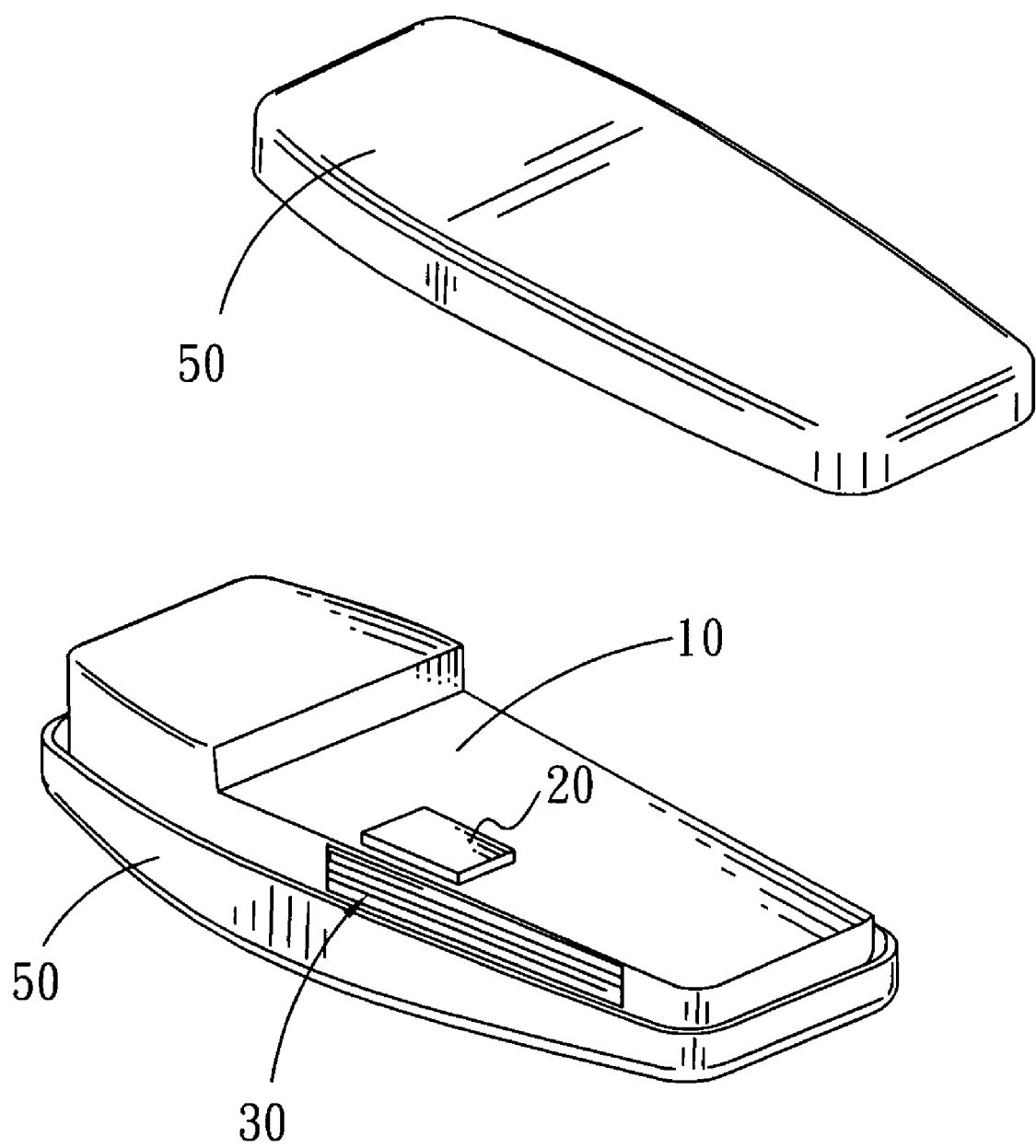
FIG. 1 is a perspective view of a mobile phone with FM antenna of a first embodiment according to the prevent invention.

Referring to FIG. 1, according to a first preferred embodiment of the present invention, a mobile phone with FM antenna comprises a mobile phone body 10, an FM microchip 20, an FM antenna 30, and a phone case 50. The FM microchip 20 is disposed on the mobile phone body 10. The FM microchip 20 processes FM radio signals transmitted from the FM antenna 30 and converts the FM radio signals to be audio signals so as to be played by the mobile phone. Thus consumers can listen to the broadcasting program by a pair of earphone or otherwise by a loudspeaker of the mobile phone. The phone case 50 encloses the mobile phone body 10, the FM antenna 30 and the FM microchip 20, so the FM antenna 30 is embedded in the mobile phone for facilitating carrying for consumers. And the FM antenna 30 resonates at the FM radio frequencies so the mobile phone is convenient to receive the FM radio broadcasting without extra external earphone.

Figure 2:
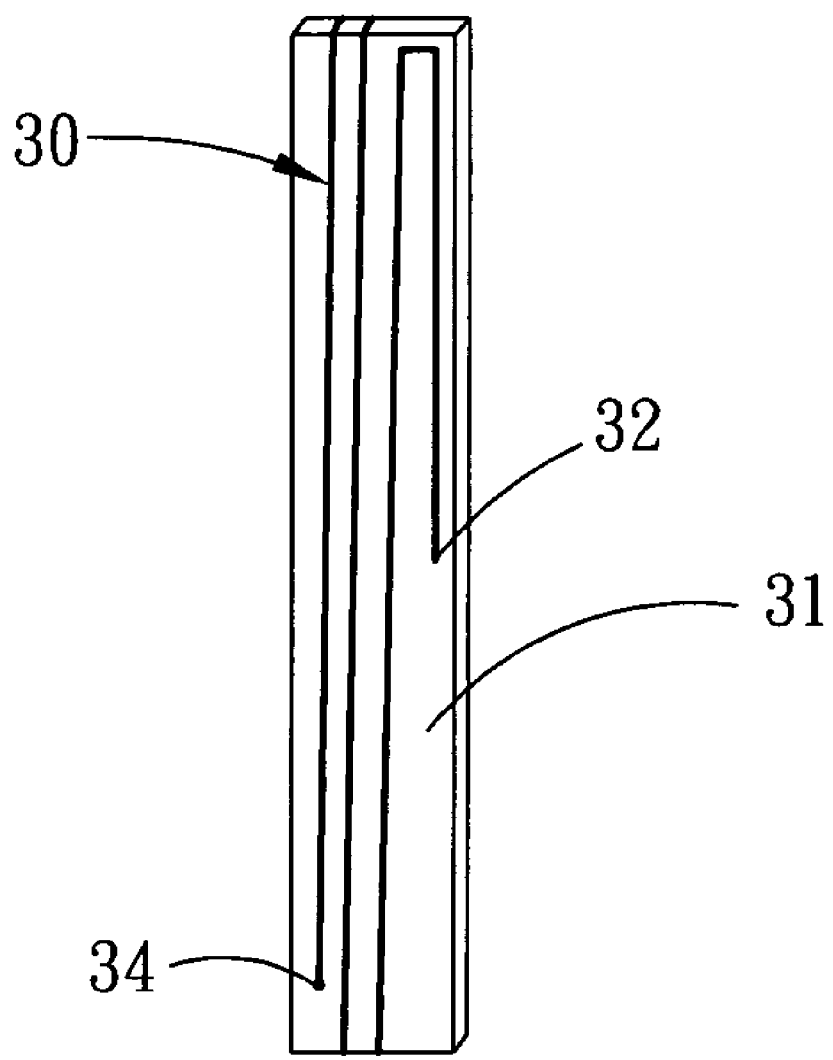
FIG. 2 is a perspective view of an FM antenna of the first embodiment as shown in FIG. 1.

Referring to FIG. 2, the FM antenna 30 is made of an electrical conductive material that is responsive to FM radio signals. In this preferred embodiment, the FM antenna 30 is made of conductive wire. One end of the FM antenna 30 has a feed point 32, and the other end of the FM antenna 30 is an opening end 34. The FM antenna 30 is spirally wrapped around a dielectric component 31, so the FM antenna 30 encircles around the dielectric component 31 at longitudinal direction to form a plurality of circles thus to be fixed on the dielectric component 31. The dielectric component 31 is fixed to a left lateral outer side of the mobile phone body 10. The feed point 32 of the FM antenna 30 is electrically coupled with the FM microchip 20.

Figure 3:
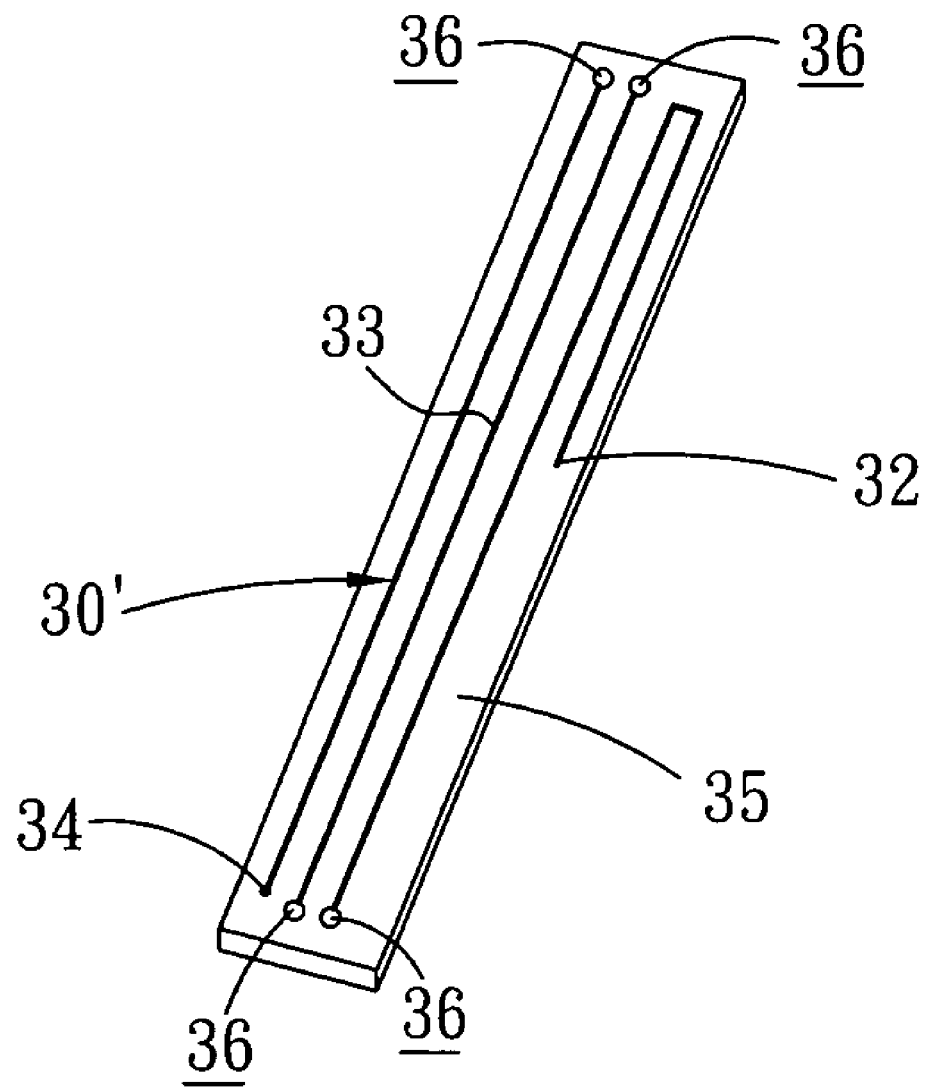
FIG. 3 is a perspective view of an FM antenna of a second embodiment as shown in FIG. 1.

Referring to FIG. 3, a second preferred embodiment of the present invention is shown. The difference between the configuration in FIG. 2 and the configuration in FIG. 3 is that the FM antenna 30' in FIG. 3 is printed on a printed circuit board 35. The FM antenna 30' consists of a plurality of conductive traces that are respectively printed on two opposite sides of the printed circuit board 35. In this preferred embodiment, the conductive traces are a plurality of parallel, equally spaced apart conductive antenna elements 33. A plurality of through vias 36 is defined in and penetrates through the printed circuit board 35 at the positions where two opposite ends of each conductive antenna element 33 are located. The inner walls of the plurality of through vias 36 are conductive metal-coated so as to electrically connect the plurality of antenna elements 33 that are printed on two opposite sides of the printed circuit board 35. Thus, the plurality of separate antenna elements 33 is electrically coupled through the plurality of through vias 36. The printed circuit board 35 is fixed to the left lateral outer side of the mobile phone body 10. As mentioned above, the phone case 50 encloses the mobile phone body 10, the FM microchip 20 and the FM antenna 30', so the FM antenna 30' is embedded in the mobile phone.

Figure 4:
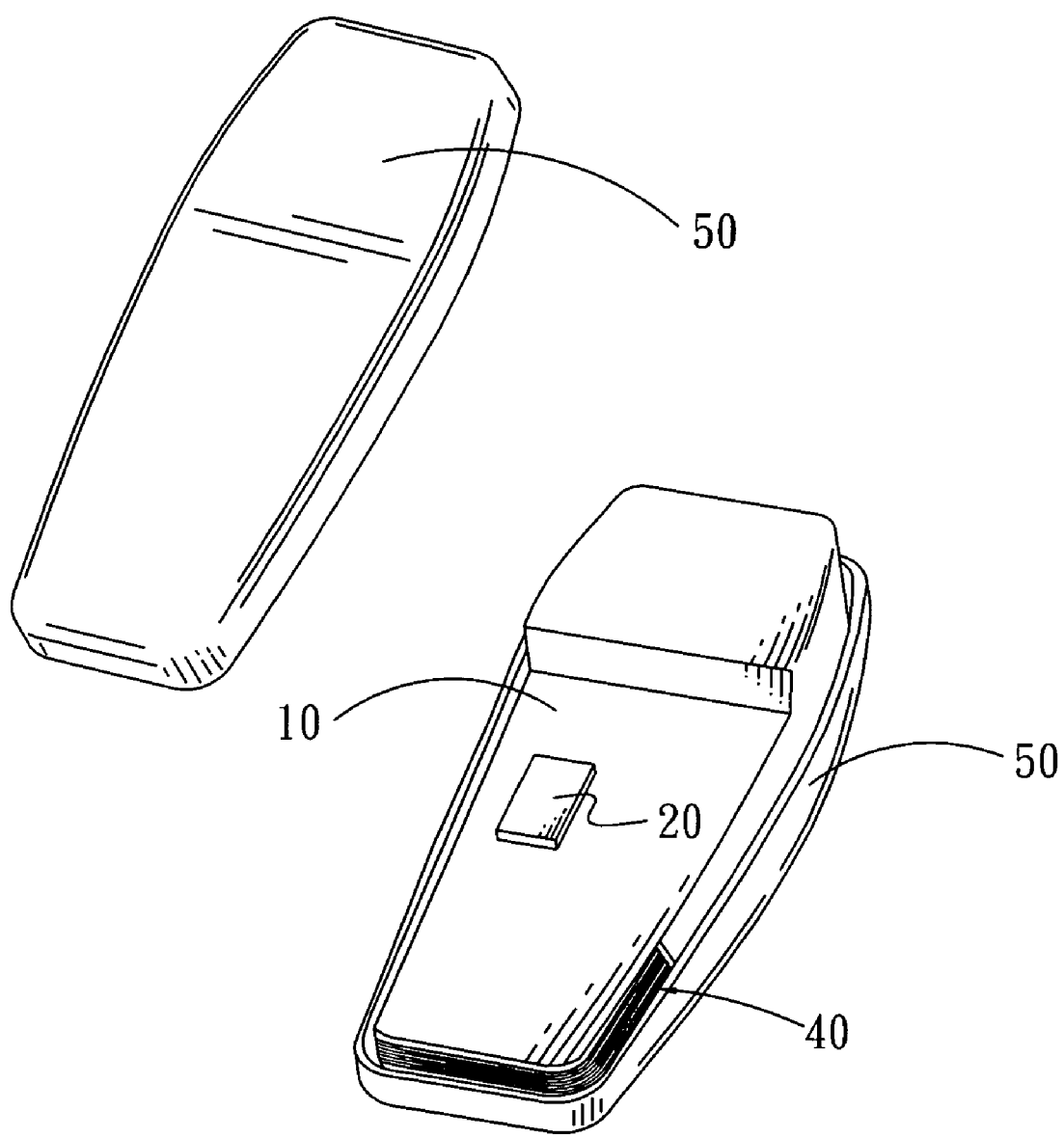
FIG. 4 is a perspective view of a mobile phone with FM antenna of a third embodiment according to the prevent invention.
Figure 5:
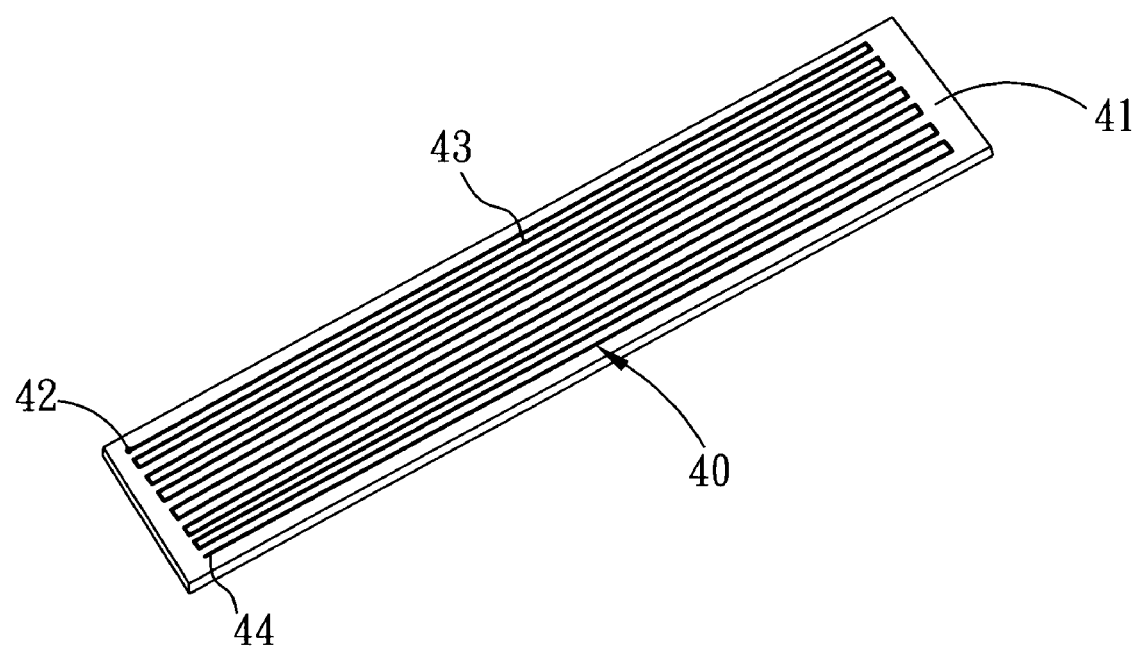
FIG. 5 is a perspective view of an FM antenna of the third embodiment as shown in FIG. 4.

FIG. 4 shows a third embodiment of the present invention. The FM antenna 40 is fixed along left and right lateral outer sides and the bottom outer side of the mobile phone body 10. Further referring to FIG. 5, in this preferred embodiment, the FM antenna 40 is printed on one side of a flexible printed circuit board 41. The FM antenna 40 consists of a plurality of conductive antenna traces 43 that meander like zigzags. One end of the FM antenna 40 has a feed point 42, and the other end of the FM antenna 40 is an opening end 44.

Referring to FIG. 4 again, when assembling the FM antenna 40 to the mobile phone body 10, for a flexibility characteristic of the printed circuit board 41, the FM antenna 40 is bent and fixed to the mobile phone body 10 along the two lateral outer sides and the bottom outer side. The feed point 42 of the FM antenna 40 is electrically coupled with the FM microchip 20 so as to transmit FM radio signals to the FM microchip 20. Thereafter, the FM antenna 40 is fixed to the mobile phone body 10 and is embedded in the mobile phone while the mobile phone body is enclosed in the phone case 50.

In most countries, such as in the United States, China, FM transmissions are within a well regulated frequency range from 88 MHz to 108 MHz. Therefore, the FM antenna associated with the mobile phone operating in the United States and China should be tuned to the particular bandwidth of 88 MHz to 108 MHz. However, in other countries the mobile phone may be operated within different regulated bandwidths for the FM radio signal transmission. For example, Japan regulates FM transmissions in the frequency bandwidth of 76 MHz to 90 MHz. Therefore, the FM antenna associated with the mobile phone operating in Japan should be tuned to this particular bandwidth. According to the above preferred embodiments, the electrical length of the FM antenna 30, 30', and 40 is appropriately dimensioned to be consistent with a quarter wavelength reception in the FM radio frequencies range from 88 MHz to 108 MHz, and the FM antenna 30, 30', and 40 resonates at the FM radio frequencies of 88 MHz to 108 MHz, such that they are applicable to receive the frequencies appropriately for FM broadcasting radio in most countries. It will be appreciated that, alternatively, the electrical length of the FM antenna 30, 30', and 40 can also be dimensioned to be consistent with a quarter wavelength reception in the FM radio frequencies range from 76 MHz to 90 MHz such that they are applicable to receive the frequencies appropriately for FM broadcasting radio in Japan.

As described above, the FM antenna 30, 30', and 40 is fixed to the mobile phone body 10 and is embedded in the mobile phone. When to listen to FM broadcasting by the mobile phone, consumers just need to switch on the FM function, then the FM antenna 30, 40 resonates at the FM radio frequencies to receive the FM radio signals without an extra external earphone. Compared to the prior art that the FM radio signals reception is dependent on the extra external earphone, the FM antenna 30, 30', and 40 of the present invention that is independently designed and embedded in the mobile phone provides enough bandwidth and gain, thereby achieving excellent broadcasting radio receiving efficiency.

Accordingly, there has been disclosed a mobile phone with FM antenna for receiving FM broadcasting radio. While illustrated embodiments of this invention have been disclosed herein, it is understood that various modifications and adaptations to the disclosed embodiments are possible, and it is intended that this invention be limited only by the scope of the appended claims.

What is claimed is:

1. A mobile phone with FM antenna for FM radio reception, comprising:
 a mobile phone body;
 an FM antenna being fixed to an outer side of the mobile phone body, one end of the FM antenna having a feed point, and the other end of the FM antenna being an opening end, said FM antenna resonating at FM radio frequencies so as to receive FM radio signals;
 an FM microchip disposed on said mobile phone body and coupled with said feed point of said FM antenna for processing the FM radio signals; and
 a phone case enclosing said mobile phone body, said FM antenna, and said FM microchip;
 wherein said FM antenna is printed on two opposite sides of a printed circuit board and comprises a plurality of conductive antenna elements, a plurality of through vias are defined in the printed circuit board so as to electrically couple with the plurality of conductive antenna elements, and the printed circuit board is fixed to a lateral outer side of said mobile phone body.

2. The mobile phone with FM antenna as claimed in claim 1, wherein an electrical length of said FM antenna is dimensioned to be a quarter wavelength of said FM radio frequencies.

3. The mobile phone with FM antenna as claimed in claim 1, wherein said FM antenna is tuned to said FM radio frequencies ranging from 88 MHz to 108 MHz.

* * * * *